United States Patent Office 3,387,985
Patented June 11, 1968

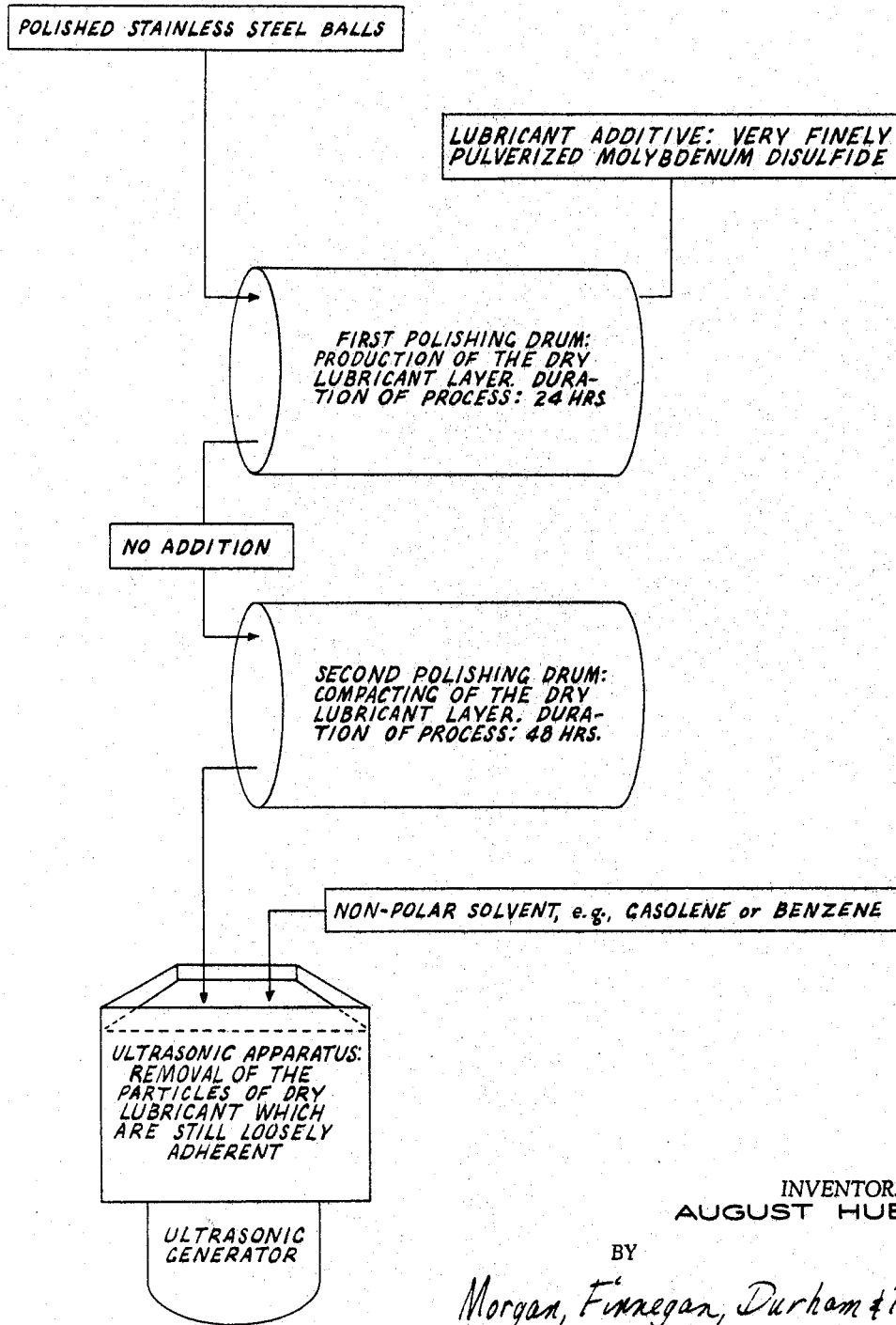

3,387,985
METHOD OF PRODUCING PERMANENTLY
LUBRICATED BEARINGS
August Huber, Lucerne, Switzerland, assignor to Landis
& Gyr, A.G., Zug, Switzerland, a corporation of
Switzerland
Continuation of application Ser. No. 50,054, Aug. 17,
1960. This application Sept. 10, 1963, Ser. No. 307,773
8 Claims. (Cl. 117—19)

This invention is a continuation of applicant's copending application, Ser. No. 50,054, filed Aug. 17, 1960, now abandoned, for Bearing and Method of Producing Same and is related to divisional application, Ser. No. 307,792, filed Sept. 10, 1963, for Oil Free Bearings and now abandoned.

This invention relates to bearings and a method of producing the same and more particularly to methods for producing oil-free bearings.

Electricity meters are built for a certain rated current which is assumed to be 100%. The extension of the measuring range to 700% which has recently become usual involves the attainment of a considerable increase in the measuring accuracy, because the starting conditions and minimum load errors do not vary. The increase in the measuring range leads to a reduction in the armature speed and in the torque and in order that the permissible minimum load error may not be exceeded, the frictional forces acting on the meter armature must be reduced accordingly. In addition, these frictional forces must be maintained considerably more constant than formerly. Thus, the use of oil as a lubricant in the pivot bearings of meters is no longer practically possible because of the progressive variation in friction resulting from thickening and resinification. The omission of the oil, however, renders the hitherto customary use of hardened and polished steel balls on jewel seatings practically impossible because they are exposed to more rapid wear and in particular to corrosion. These harmful factors increase the bearing friction in an unacceptable manner in a short time and lead to the premature failure of the electricity meter.

It has already been proposed that dry lubricants, particularly molybdenum disulphide be used. Nevertheless it is difficult to obtain a satisfactory and permanent coating of molybdenum disulphide on the hardened steel balls. Such balls are soon worn bare and corrode at the bare points.

It is accordingly an object of the invention to provide oil-free bearings and methods for producing such oil-free bearings.

Another object of the invention is to provide an oil-free method of permanently lubricating bearings.

A still further object of the invention is to provide oil-free permanently lubricated bearings for electric meters and the like.

These and other objects and advantages of the invention will be set forth hereinafter and in part will be obvious herefrom, or may be learned by practice with the invention, the same being realized and attained by means of the steps, methods, compositions, combinations and improvements pointed out in the appended claims.

The invention relates to an oil-free double jewel bearing for electricity meters having a steel ball situated between the two bearing jewels, which is characterized in that the steel ball consists of stainless steel and is provided with a layer of a dry lubricant which adheres to its surface.

The invention further relates to a method of producing such bearings characterized in that, in order to produce a layer of a dry lubricant which adheres to the surface of the balls, polished balls of stainless steel are rolled in a tumbler with the addition of a finely pulverized lubricant, the layer of lubricant which is still clinging loosely is consolidated by prolonged rolling of the balls in a tumbler without the addition of lubricant, after which any particles of the lubricant which are still clinging loosely are removed by ultrasonic treatment in a solvent such as benzine, benzene, etc.

The invention consists in the novel steps, methods, compositions, combinations and improvements herein shown and described.

In the method according to the invention, molybdenum disulphide, known per se, is the most suitable dry lubricant, in a finely pulverized form with a particle size smaller than 0.005 mm.

In an example, balls for double jewel bearings consisting of stainless steel with a diameter of 1.588 mm. and a polished surface were rolled in a tumbler with the addition of molybdenum disulphide for 24 hours after which the layer of molybdenum disulphide which was still clinging loosely was consolidated by rolling in another tumbler without any additive for 48 hours. In 86% of the particles, the particle size of the finely pulverized molybdenum disulphide amounted to less than $2\mu$ and in 43% of the particles it was less than $0.5\mu$. The thickness of the layer obtained amounted to about $2\mu$. After this, the balls were subjected to an ultrasonic treatment in benzine for 2 to 3 minutes as a result of which the still loose particles were removed. The layer thus obtained had a thickness of less than $1\mu$ and was extremely resistant to abrasion. In double jewel bearings between two sapphire seatings the balls had a coefficient of friction which corresponded approximately to that of hardened, mirror-finished and oiled steel balls but with the difference that it remained constant over a long period and was almost completely independent of the temperature.

The invention in its broader aspects is not limited to the specific methods, steps, compositions, combinations and improvements described but departures may be made therefrom within the scope of the accompanying claims without departing from the principles of the invention and without sacrificing its chief advantages.

What is claimed is:

1. The method of producing permanently lubricated, oil-free double-jewel electric meter thrust bearings comprising the steps of rolling stainless steel polished balls in a polishing drum with the addition of a finely pulverized lubricant for a period of time $t$ until a firmly adhering layer of the lubricant is developed on their surface, compacting said layer by lengthy rolling of the balls in another polishing drum without the addition of lubricant for a period of time at least equal to $2t$ and removing still loosely adhering parts of the lubricant by ultrasonic treatment in a solvent.

2. A method according to claim 1, in which said lubricant powder comprises molybdenum disulfide in a particle size of less than 0.005 mm.

3. The method according to claim 1 in which said period $2t$ is of an actual magnitude to reduce said compacted layer to a thickness amounting to about $2\mu$.

4. The method according to claim 1 in which said period $2t$ and the length of said ultrasonic treatment are of magnitudes which reduce the resultant layer of said lubricant to a thickness less than $1\mu$.

5. A process for the production of oil-free double-jewel electric meter thrust bearings having a stainless steel ball lodged between the bearing jewels, said process comprising the steps of:

rolling polished steel balls of stainless steel under the admixture of a finely powdered dry lubricating agent with a particle grain size of less than 0.005 mm. for at least 24 hours and until the dry lubricating agent layer produced on the surface thereof becomes firmly adhesive;

introducing said balls thus treated into a second polishing drum and rolling same for at least 48 hours for the purpose of concentrating said dry lubricating agent layer;

subjecting the balls thus treated to an ultrasonic cleaning process in a solvent to eliminate any remaining loose particles.

6. The process of claim 5 in which said ultrasonic cleaning is of a period sufficient to reduce the thickness of said concentrated layer to less than $1\mu$.

7. The method of producing permanently lubricated oil free bearings comprising the steps of rolling stainless steel polished balls in a polishing drum with the addition of a finely pulverized molybdenum sulfide lubricant of a particle size of less than 0.005 mm. for a period of time $t$ until a firmly adhering layer of the lubricant is developed on their surfaces, compacting said layer by lengthy rolling of the balls in another polishing drum without the addition of lubricant for a period of time at least equal to $2t$ sufficient to reduce said compacted layer to a thickness amounting to about 2 microns and removing loosely adhering parts of the lubricant by ultrasonic treatment in a solvent.

8. A process for the production of oil free bearings comprising the steps of rolling polished stainless steel balls under the admixture of a finely powdered dry molybdenum sulfide lubricating agent with a particle size of less than 0.005 mm. for at least 24 hours and until the dry lubricating agent layer produced on the surface thereof becomes firmly adhesive; introducing said balls thus treated into a second polishing drum and rolling the same for a time of at least 48 hours sufficient for the purpose of concentrating said dry lubricating layer to a thickness of less than about 2 microns; subjecting the balls thus treated to an ultrasonic cleaning process in a solvent to eliminate any loose particles and to reduce the thickness of said concentrated layer to less than 1 micron.

References Cited

UNITED STATES PATENTS

| 2,048,708 | 7/1936 | Pfanstichl | 308—242 |
| 2,378,588 | 6/1945 | Skehan et al. | 117—109 |
| 2,387,872 | 10/1945 | Bell | 117—65.2 |
| 2,423,880 | 7/1947 | De Graaf | 117—109 |
| 2,554,701 | 5/1951 | Hackett et al. | 117—64 |
| 2,616,820 | 11/1952 | Bourgeaux. | |
| 2,731,360 | 1/1956 | Love | 117—64 |
| 3,023,127 | 2/1962 | Clayton | 117—100 |
| 3,075,279 | 1/1963 | Haltner et al. | 117—64 |

FOREIGN PATENTS 555,519   8/1943   Great Britain.

MURRAY KATZ, *Primary Examiner.*